May 12, 1931.  W. R. HATHAWAY  1,804,416
PIPE HANGER FOR ELECTRICAL CONDUITS AND THE LIKE
Filed July 9, 1927  2 Sheets-Sheet 1
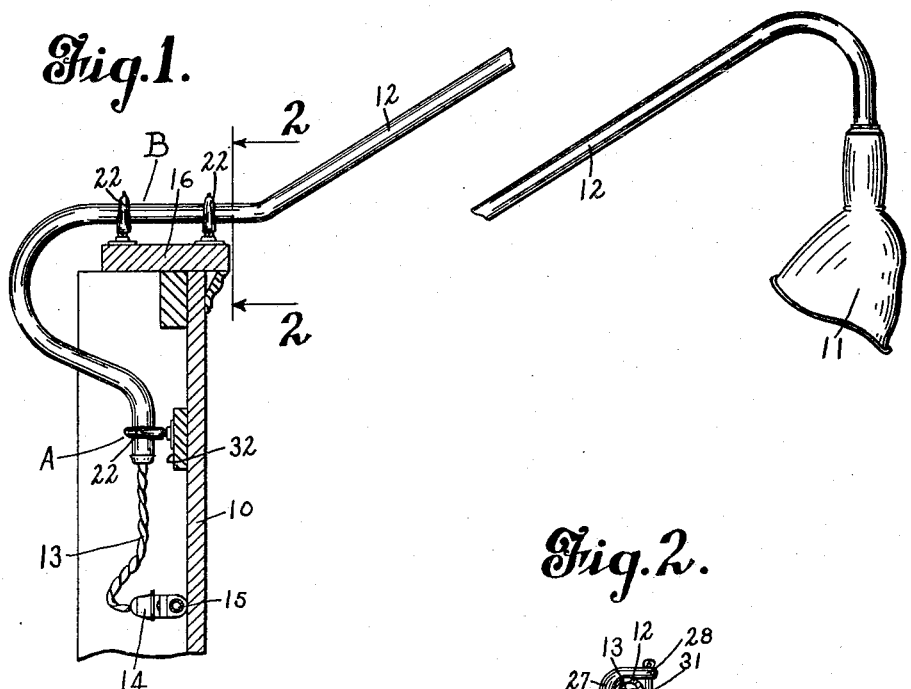
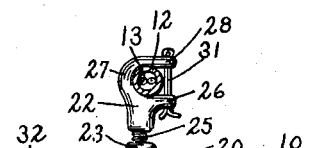
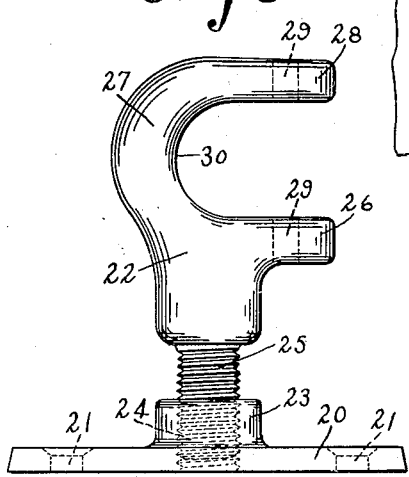
Inventor
William R. Hathaway
By Rockwell & Bartholow
Attorneys May 12, 1931.  W. R. HATHAWAY  1,804,416

PIPE HANGER FOR ELECTRICAL CONDUITS AND THE LIKE

Filed July 9, 1927  2 Sheets-Sheet 2

Inventor
William R. Hathaway
By Rockwell & Bartholow
Attorneys

Patented May 12, 1931

1,804,416

UNITED STATES PATENT OFFICE

WILLIAM R. HATHAWAY, OF NEW HAVEN, CONNECTICUT, ASSIGNOR TO UNITED ADVERTISING CORPORATION, OF NEW HAVEN, CONNECTICUT

PIPE HANGER FOR ELECTRICAL CONDUITS AND THE LIKE

Application filed July 9, 1927. Serial No. 204,578.

This invention relates to pipe hangers for electrical conduits, pipes, and the like, and more particularly to a pipe hanger or support for retaining an overhanging tubular or rod-like member used for supporting an electric light relatively to an advertising signboard. The pipe hanger is, however, adapted to a variety of uses such as a support for gas, water, steam drain pipes or to form a bracket adapted to support a plurality or bank of the same.

As here illustrated, the invention is embodied in one instance in a support for an electric light bracket, comprising a tubular member or conduit, whereby the light is retained in position upon a signboard and disposed so as to illuminate the same. When used for this purpose, it is desirable that the bracket be rigidly supported but readily removable or disengageable to permit any repairs to the electric light that become necessary, such as the replacement of burned out light globes or broken reflectors. The construction of the signboard is frequently such that the light bracket must be disposed thereon at a certain angle relatively thereto, and therefore, it is desirable that the bracket support or conduit clamp be adapted to be readily adjustable to various positions so as to efficiently support the light bracket at the required angle. In another instance, the invention is embodied in a bracket composed of a plurality of pipe supports whereby a bank or plurality of pipes may be supported.

One of the objects of this invention is to provide an improved pipe hanger or rod-like bracket support, which will be inexpensive to manufacture and efficient in use.

Another object of this invention is to provide a pipe hanger or bracket support which will be readily adjustable to suit the conditions required in the installation of the pipe or bracket to be supported thereby.

Still another object of this invention is to provide in a pipe hanger or like structure, a combination of features including means to detachably engage and support a rod-like or tubular member.

A further object of this invention is to provide a pipe hanger or like structure, having cooperating means permitting a part thereof to be disposed at an angle to another part thereof without affecting the supporting or article engaging means.

A still further object of this invention is to provide a pipe hanger or like structure which will be adapted for connection with other and similar devices to form a bracket to support a plurality of pipes or the like, and still be readily mounted and secured upon a supporting member in a variety of positions relatively thereto.

To these and other ends, the invention consists in the novel features and combinations of parts to be hereinafter described and claimed.

In the accompanying drawings:

Fig. 1 illustrates the use of my improved pipe hanger when supporting an electric light bracket upon and extending over a signboard;

Fig. 2 is a sectional view on lines 2—2 of Fig. 1;

Fig. 3 is an enlarged side view of a pipe hanger or bracket support, embodying the features of my invention, and Figs. 4 and 5 illustrate the use of somewhat modified forms of pipe hangers to form a bracket adapted to support a plurality of pipes or the like.

Figure 4:
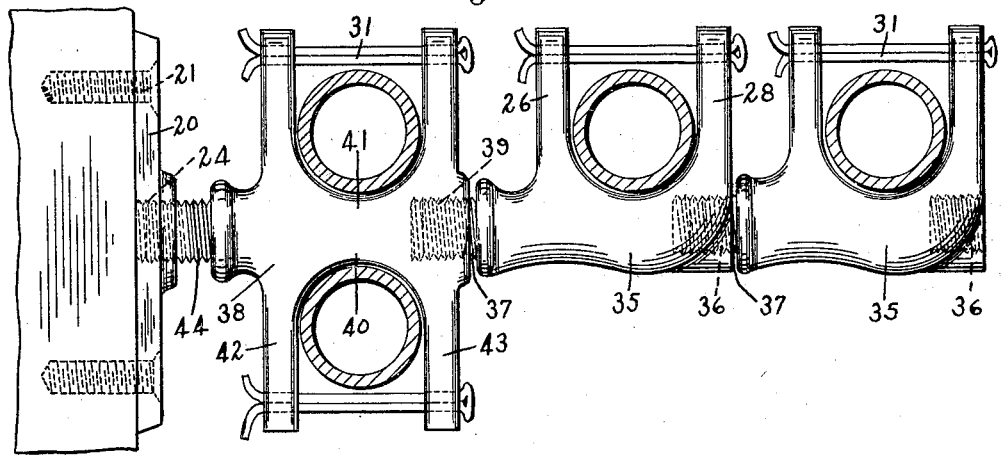

Figs. 1 to 3 inclusive of the drawings illustrate one use for the article embodying my invention. In this instance, a signboard 10, such as is generally mounted upon the tops of high buildings, is arranged to be illuminated by the electric light 11. A length of conduit pipe 12 is used to form the light supporting bracket as well as to receive the electric wires 13 which supply the light with power. The wires 13 are connected with a suitable plug 14, which in turn is electrically connected to main supply wires disposed in a conduit 15, which generally extends the length of the sign.

In this instance, the conduit 12 is bent to extend upwardly and over a top ledge 16 of the signboard 10, and due to the extent of the overhang of the electric light, must be rigidly supported to the signboard. In such instances, it is desirable that the bracket or conduit 12 be adapted to be readily disengaged so that the light 11 may be swung inwardly toward the board or removed therefrom to permit accessibility thereto for repairs to or replacement of broken or damaged parts. For this purpose, the novel support or pipe hanger of this invention, as shown in Fig. 3, is especially useful.

The pipe hanger or support embodying the principal features of my invention, comprises a base plate 20 which is provided with screw or bolt holes 21 and a conduit receiving part 22. The plate 20 is provided with substantially centrally disposed boss 23 in which a threaded opening 24 is provided. The base plate 20 is generally rectangular in shape being longer in one direction than in the other, in this instance, substantially twice as long as wide and is preferably made of malleable iron and, therefore, inexpensive.

The conduit receiving and engaging part 22 is preferably made of malleable iron and is provided with a downwardly extending stem portion 25, which is threaded to adapt it to fit into the threaded opening 24 in the boss 23 of the base plate 20. The part 22 extends upwardly from the threaded stem 25 and merges into the lower arm 26 of a C shaped conduit receiving portion 27, the upper arm 28 of which is disposed at its outer end substantially parallel to arm 26 thereof, and is vertically spaced therefrom an amount substantially equal to the diameter of the conduit or rod-like article to be received therebetween. Each of the arms 26 and 28 is provided with an opening 29, which passes vertically therethrough, the opening in one being in alignment with the opening in the other arm. The openings 29 are disposed adjacent the outer ends of the arms, being spaced from the inner periphery 30 of the C shape an amount substantially equal to the diameter of the conduit or rod-like article to be received therein. The openings 29 are adapted to receive a cotter pin or other readily detachable member 31.

The provision of a base plate rectangular in form, being longer than it is wide, permits the mounting of the support 22 upon either a narrow or broad ledge surface 32, and the provision of the pivotal connection formed by the cooperating threads in the opening 24 and on the stem 25, permits this disposition of the base without affecting the use of the conduit receiving portion 22. The threaded connection formed as above noted, also provides a vertical adjustment between the plate 20 and the conduit receiving portion 22, so that the device may be adjusted to correspond to the required spacing between the conduit and the ledge surface 32, or to properly position the bracket 12 and the light 11 supported thereby relatively to the signboard 10. This latter use is illustrated at A, in Fig. 1, where such an adjustment of the support 22 will adjust the light 11 toward or away from the signboard 10.

Two of the pipe hangers or supports 22 are shown at B, Fig. 1, mounted upon the ledge 16. These, in combination with the one at A, Fig. 1, in view of the form of the conduit 12, form a rigid support therefor. The conduit or bracket 12, however, may be readily attached or disengaged from the two members 22 at B, Fig. 1, by the withdrawal of the pipe or rod retaining means 31, and the bracket may then be swung about the support 22 at A, as a pivot and toward the board 10, or by the withdrawal of the same means 31 in this support, may be entirely removed.

The provision of a two part yet readily assembled pipe hanger or support, facilitates the installation thereof, as the plate 20 may be positioned and secured in place without the possible interference of the overhanging C shaped portion 27. After mounting the plate 20, the portion 22 may be readily assembled thereto and adjusted in substantially its proper position, due to the threaded connection therebetween. The pivotal connection between the parts 20 and 22 of this device, permits the disposition of one relatively to the other at any desired angle to a horizontal axis through the part 20, with the threaded stem as a center point whereby a conduit or other rod-like member may be disposed relatively to a supporting structure at a variety of angles to a horizontal axis through the structure, while being retained substantially parallel to the plane thereof.

Figure 5:
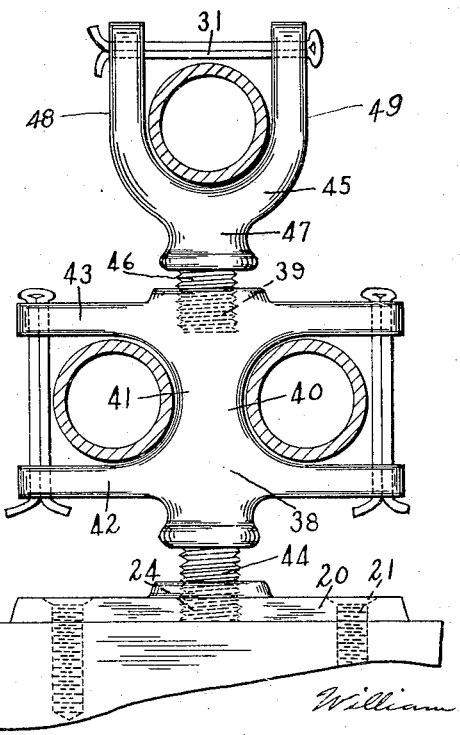

Figs. 4 and 5 of the drawings illustrate somewhat modified forms of pipe hangers secured together to form a bracket to support a plurality of pipes such as a bank of steam or water pipes. The base plate 20 shown in both of these figures is the same as that previously described and the pipe securing parts 35 are similar to the conduit receiving part 22, differing only in the addition of a threaded socket 36 disposed in alignment with the stem portion 37 which is the same as the previously described stem portion 25. The stem portions 37 are adapted to thread into the threaded socket 36 of each part 35, or into the threaded opening 24 in the plate 20. The stem portions 37 of the parts 35 are also adapted to threadingly engage a part 38 within a threaded opening 39 provided therein.

The part 38 comprises a pair of oppositely directed and aligned pipe securing portions 40 and 41, which are interconnected and are each provided with outwardly extending arms 42 and 43. The arms 42 and 43 are disposed similarly to the arms 26 and 28 of the previously described part 22, with respect to each other. A threaded stem 44 extends away from the interconnecting portion between the pipe receiving portions 40 and 41, and in alignment with the threaded opening 39. The stem 44 is adapted to thread into the opening 24 of part 20 or into the threaded sockets or openings 36 or 39, referred to above.

In Fig. 5 another form of pipe hanger part 45 is illustrated, the part 45 is provided with a threaded stem 46 which extends from a portion 47. A pair of arms 48 and 49 extend from the portion 47 in a direction opposite to the extended direction of the stem 46 and are disposed substantially parallel to the axis thereof. The threaded stem 46 is adapted to thread into either of the threaded openings 24, 36 or 39.

While I have shown and described a preferred form and application of my invention, it is to be understood that the same is not limited thereto in all of the details shown, as many modifications and variations thereof are possible which will lie within the spirit of the invention and the scope of the appended claims.

What I claim is:

1. In a device for supporting a rod-like article, a member having a pair of arms extending therefrom substantially parallel to each other and having a threaded stud extending therefrom substantially at right angles to said arms, and a threaded socket in alignment with said stud to receive the stud of another similar member.

2. In a device for supporting a rod-like article, a member having a stud depending therefrom and adapted to seat in a socket formed in a supporting member, a pair of spaced apart arms extending laterally from one side of said member and adapted to receive a rod-like member therebetween to support the same, and means extending between said arms at the outer ends thereof to retain the received rod-like member therebetween, said member having a socket formed therein substantially in alignment with said stud and adapted to receive the stud of and support a similar member.

3. A device for supporting a rod-like member, comprising a part having a stud depending therefrom, and an opening in the side thereof to receive a rod-like member therein laterally with respect to the axis of said stud, said part having a socket substantially in alignment with said stud, and adapted to receive the stud of a similar member.

4. A device for supporting a rod-like member comprising a part having a pair of arms extending laterally therefrom and adapted to receive a rod-like member therebetween, said arms extending an amount greater than the diameter of the rod-like member received therebetween, means extending between said arms and disposed inwardly from the outer end thereof to retain the rod-like member therein, and a threaded portion depending from one of said arms, the other of said arms having a threaded socket formed therein and disposed in alignment with said depending threaded portion to receive the threaded portion of a similar device to support the same.

5. In a device for supporting a rod-like article, a member having a stud extending therefrom and adapted to be secured to a support, said member having a pair of spaced apart arms extending laterally from one side thereof in substantially parallel relation and adapted to receive the rod-like member therebetween and support said member on one of said arms, said arms being provided adjacent their free ends with aligned openings and a pin-like member passed through said openings and releasably secured therein to hold the rod-like member in place.

In witness whereof, I have hereunto set my hand this 7th day of July, 1927.

WM. R. HATHAWAY.